(12) United States Patent
Shioya et al.

(10) Patent No.: US 10,895,166 B2
(45) Date of Patent: Jan. 19, 2021

(54) TURBOCHARGER

(71) Applicant: IHI Corporation, Koto-ku (JP)

(72) Inventors: Takayuki Shioya, Tokyo (JP); Akira Iwakami, Tokyo (JP); Satoshi Shimoda, Tokyo (JP); Takafumi Ueda, Tokyo (JP)

(73) Assignee: IHI Corporation, Koto-ku (JP)

( * ) Notice: Subject to any disclaimer, the term of this patent is extended or adjusted under 35 U.S.C. 154(b) by 1 day.

(21) Appl. No.: 16/104,197

(22) Filed: Aug. 17, 2018

(65) Prior Publication Data

US 2018/0355752 A1    Dec. 13, 2018

Related U.S. Application Data

(63) Continuation of application No. PCT/JP2017/013980, filed on Apr. 3, 2017.

(30) Foreign Application Priority Data

Apr. 5, 2016 (JP) .................. 2016-075839

(51) Int. Cl.
*F01D 25/08* (2006.01)
*F01D 17/16* (2006.01)
(Continued)

(52) U.S. Cl.
CPC ............ *F01D 25/08* (2013.01); *F01D 11/003* (2013.01); *F01D 17/16* (2013.01); *F01D 17/165* (2013.01);
(Continued)

(58) Field of Classification Search
None
See application file for complete search history.

(56) References Cited

U.S. PATENT DOCUMENTS 3,270,951 A * 9/1966 Reed ................. F02B 37/18
60/602
3,941,437 A * 3/1976 MacInnes ............ F01D 25/24
384/287

(Continued)

FOREIGN PATENT DOCUMENTS

CN    102782283 A    11/2012
JP    63-010231 U    1/1988
(Continued)

OTHER PUBLICATIONS

International Search Report dated Jun. 20, 2017 in PCT/JP2017/013980 filed Apr. 3, 2017 (with English Translation).
(Continued)

*Primary Examiner* — Michael Lebentritt
(74) *Attorney, Agent, or Firm* — Oblon, McClelland, Maier & Neustadt, L.L.P.

(57) ABSTRACT

Provided is a turbocharger, including: a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft; and a heat-shielding plate, including: a main body portion (separation portion), which is separated from the separation wall surface in the axial direction, and is positioned between the back surface of the turbine impeller and the separation wall surface; and an insertion through hole (insertion portion), which receives a fastening member inserted thereinto in a direction of intersecting the axial direction of the shaft, the heat-shielding plate being mounted to the bearing housing by the fastening member.

12 Claims, 7 Drawing Sheets

(51) Int. Cl.
  *F02B 37/24* (2006.01)
  *F01D 25/14* (2006.01)
  *F01D 11/00* (2006.01)
  *F01D 25/16* (2006.01)

(52) U.S. Cl.
  CPC ......... *F01D 25/145* (2013.01); *F01D 25/162* (2013.01); *F02B 37/24* (2013.01); *F05D 2220/40* (2013.01); *F05D 2240/128* (2013.01); *F05D 2240/15* (2013.01); *F05D 2240/50* (2013.01); *F05D 2240/55* (2013.01); *Y02T 10/12* (2013.01)

(56) References Cited

U.S. PATENT DOCUMENTS

| | | | | |
|---|---|---|---|---|
| 3,969,804 | A * | 7/1976 | MacInnes | F01D 25/166 29/888.025 |
| 4,474,484 | A * | 10/1984 | MacInnes | F01D 25/164 384/215 |
| 6,905,316 | B2 * | 6/2005 | Parker | F01D 25/164 417/407 |
| 7,793,499 | B2 * | 9/2010 | Gutknecht | F01D 25/166 184/6.11 |
| 8,845,271 | B2 * | 9/2014 | Woollenweber | F01D 25/16 384/277 |
| 8,857,180 | B2 * | 10/2014 | Begin | F01D 25/166 123/41.31 |
| 2016/0245160 | A1 | 8/2016 | Ueda et al. | |
| 2016/0265484 | A1 * | 9/2016 | Annati | F02B 37/24 |
| 2019/0071987 | A1 * | 3/2019 | Shioya | F01D 9/041 |
| 2019/0234304 | A1 * | 8/2019 | Kitamura | F01D 17/16 |

FOREIGN PATENT DOCUMENTS

| | | |
|---|---|---|
| JP | 2010-053793 | 3/2010 |
| JP | 2011-085054 | 4/2011 |
| JP | 2011-247189 | 12/2011 |
| JP | 2011-252439 | 12/2011 |
| JP | 2013-231404 | 11/2013 |
| JP | 2013-245655 | 12/2013 |
| JP | 2013-253521 | 12/2013 |
| JP | 2014-169641 | 9/2014 |
| JP | 2015-140739 A | 8/2015 |
| JP | 2015-140740 | 8/2015 |
| JP | 2016-008575 | 1/2016 |
| JP | 2016-020652 | 2/2016 |

OTHER PUBLICATIONS

Written Opinion dated Jun. 20, 2017 in PCT/JP2017/013980 filed Apr. 3, 2017.
International Preliminary Report on Patentability and Written Opinion dated Oct. 18, 2018 in PCT/JP2017/013980 (submitting English translation only).
Chinese Office Action issued in Chinese Patent Application No. 201780011870.0 dated Dec. 30, 2019, (w/ English Translation).

* cited by examiner

TURBOCHARGER

CROSS REFERENCE TO RELATED APPLICATIONS

This application is a continuation application of International Application No. PCT/JP2017/013980, filed on Apr. 3, 2017, which claims priority to Japanese Patent Application No. 2016-075839, filed on Apr. 5, 2016, the entire contents of which are incorporated by reference herein.

BACKGROUND ART

Technical Field

The present disclosure relates to a turbocharger in which a heat-shielding plate is arranged between a back surface of a turbine impeller and a bearing housing.

Related Art

Hitherto, a turbocharger of a variable capacity type has been widely used. In such a turbocharger, for example, as disclosed in Patent Literature 1, a plurality of nozzle vanes are annularly arrayed in a flow passage for introducing exhaust gas from a turbine scroll flow passage to a turbine impeller. The nozzle vanes are mounted to blade shafts. When the blade shafts are rotated by power of an actuator, angles of the nozzle vanes are changed in the flow passage along with the rotation of the blade shafts. A flow passage width (so-called nozzle throat width) is changed so that a flow rate of the exhaust gas flowing through the flow passage is controlled.

Further, according to Patent Literature 1, a heat-shielding plate is provided between a turbine housing and a bearing housing. The turbine housing receives a turbine impeller. The bearing housing receives a bearing. The heat-shielding plate suppresses transfer of heat from the turbine impeller side to the bearing side. A wall member retains nozzle vanes. A radially outer end portion of the heat-shielding plate is sandwiched between the wall member and the bearing housing. In such a manner, the heat-shielding plate is retained in the housing.

CITATION LIST

Patent Literature

Patent Literature 1: Japanese Patent Application Laid-Open No. JP 2013-253521

SUMMARY

Technical Problem

In the configuration of Patent Literature 1 described above, the heat-shielding plate is sandwiched between the wall member and the bearing housing. This spring member causes the heat-shielding plate to press the wall member. Depending on an operation condition, thermal deformation of the wall member is promoted. There is a fear in that such thermal deformation affects the operation characteristic of the nozzle vanes. Therefore, a large clearance (side clearance) is set between the wall member and the nozzle vanes.

In view of such circumstance, it is conceivable to mount the heat-shielding plate to the bearing housing without sandwiching the heat-shielding plate between the wall member and the bearing housing. However, when the heat-shielding plate is held in close contact with the bearing housing, transfer of heat from the heat-shielding plate to the bearing housing is promoted. There is a fear of causing degradation in heat-shielding characteristic.

Therefore, an object of the present disclosure is to provide a turbocharger capable of improving heat-shielding characteristic while a heat-shielding plate is mounted to a bearing housing.

Solution to Problem

In order to solve the above problem, according to one embodiment of the present disclosure, there is provided a turbocharger, including: a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft; and a heat-shielding plate, including: a separation portion, which is separated from the separation wall surface in the axial direction, and is positioned between the back surface of the turbine impeller and the separation wall surface; and an insertion portion, which receives a fastening member inserted thereinto in a direction of intersecting the axial direction of the shaft, the heat-shielding plate being mounted to the bearing housing by the fastening member.

The turbocharger may include: a projecting portion, which is formed on the heat-shielding plate, projects from the separation portion toward a side opposite to the turbine impeller, and has the insertion portion; an annular groove, which is formed in the bearing housing, and receives the projecting portion inserted thereinto; and a penetrating hole, which is formed in a wall portion forming the annular groove, and is opposed to the insertion portion. The fastening member may be inserted from the penetrating hole, and a distal end of the fastening member is inserted into the insertion portion.

In order to solve the above problem, according to one embodiment of the present disclosure, there is provided a turbocharger, including: a nozzle drive mechanism including a plurality of nozzle vanes; a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft; a projection portion, which is positioned on a radially outer side of the shaft with respect to the separation wall surface in a bearing housing, and is opposed to the nozzle drive mechanism from a radially inner side of the shaft; a seal ring which is provided in a seal groove formed in an opposing surface of the projection portion with respect to the nozzle drive mechanism; and a heat-shielding plate, which includes a separation portion separated from the separation wall surface in the axial direction and positioned between a back surface of the turbine impeller and the separation wall surface, and is mounted to the bearing housing.

The turbocharger may include an insertion portion, which is formed in the heat-shielding plate, and receives a fastening member inserted thereinto in the axial direction of the shaft.

The turbocharger may include an insertion portion, which is formed in the heat-shielding plate, and receives a fastening member inserted thereinto in a direction of intersecting the axial direction of the shaft.

The turbocharger may include: a projecting portion, which is formed on the heat-shielding plate, projects from the separation portion toward a side opposite to the turbine impeller, and has the insertion portion; an annular groove, which is formed in the bearing housing, and receives the projecting portion inserted thereinto; and a penetrating hole, which is formed in a wall portion forming the annular groove, and is opposed to the insertion portion. The fastening member may be inserted from the penetrating hole, and a distal end of the fastening member is inserted into the insertion portion.

The turbocharger may include: a projecting portion, which is formed on the heat-shielding plate, projects from the separation portion toward a side opposite to the turbine impeller, and has an inner peripheral surface having an inclined shape of being inclined with respect to the axial direction of the shaft; and a fitting portion, which is formed on the bearing housing, projects from a wall surface on the turbine impeller side toward the separation portion side, has an outer peripheral surface having an inclined shape of being inclined along an inner peripheral surface of the projecting portion, and is fitted along an inner periphery side of the projecting portion.

In order to solve the above problem, according to one embodiment of the present disclosure, there is provided a turbocharger, including: a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft; and a heat-shielding plate, including: a separation portion, which is separated from the separation wall surface in the axial direction, and is positioned between the back surface of the turbine impeller and the separation wall surface; and an insertion portion, which receives a fastening member inserted thereinto in a direction orthogonal to the axial direction of the shaft, the heat-shielding plate being mounted to the bearing housing by the fastening member.

Effects of Disclosure

According to the present disclosure, the heat-shielding characteristic can be improved while the heat-shielding plate is mounted to the bearing housing.

DESCRIPTION OF EMBODIMENT

Figure 1:
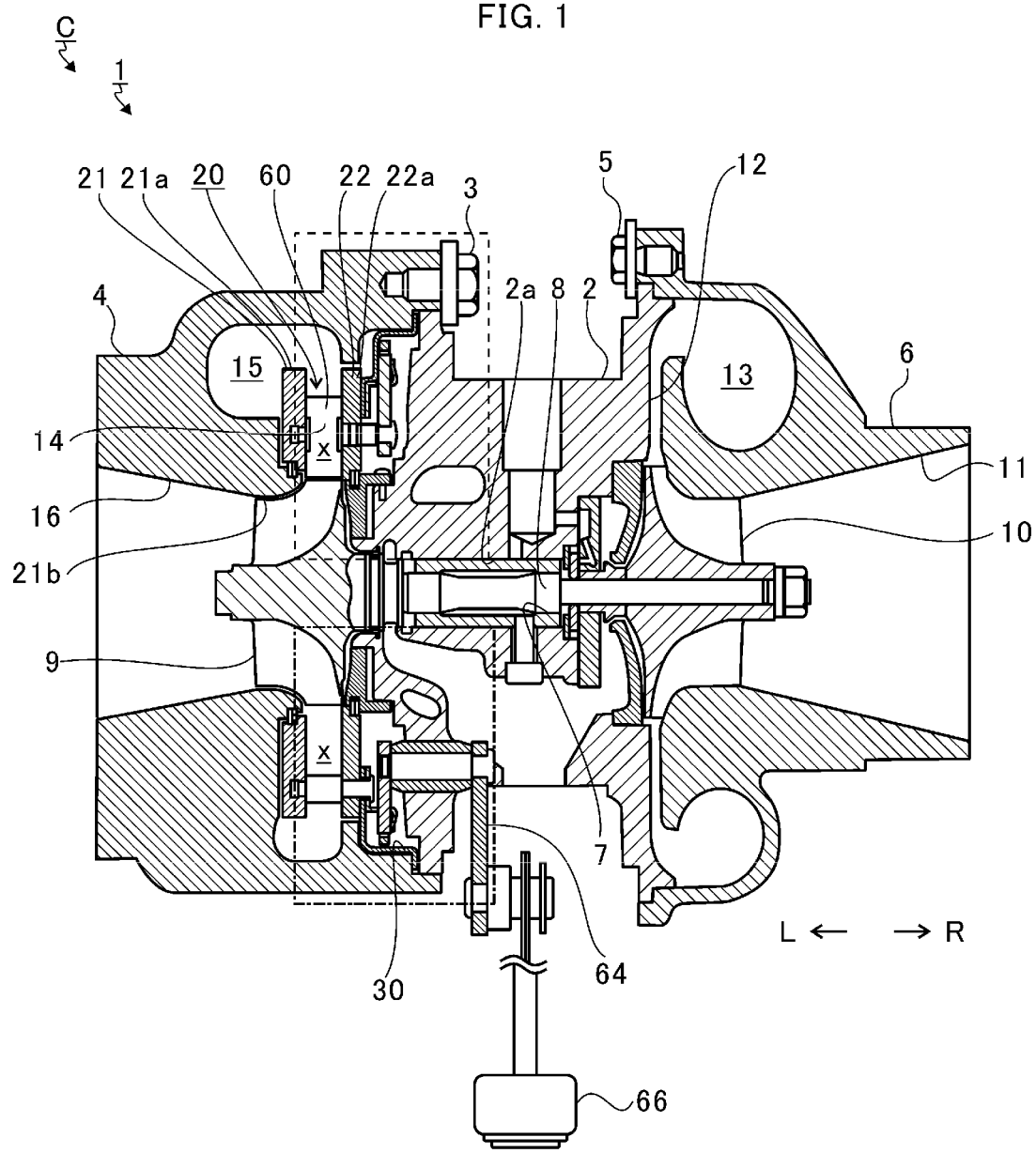
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C. The direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2. A turbine housing 4 is coupled to the left side of the bearing housing 2 by a fastening bolt 3. A compressor housing 6 is coupled to the right side of the bearing housing 2 by a fastening bolt 5. The bearing housing 2, the turbine housing 4, and the compressor housing 6 are integrated.

The bearing housing 2 has a receiving through hole 2a. The receiving through hole 2a penetrates through the turbocharger C in a right-and-left direction. A shaft 8 is axially supported so as to be rotatable by a radial bearing 7 which is received in the receiving through hole 2a (in this embodiment, a semi-floating bearing is illustrated in FIG. 1 as an example). A turbine impeller 9 is provided to a left end portion of the shaft 8. The turbine impeller 9 is received in the turbine housing 4 so as to be rotatable. Further, a compressor impeller 10 is provided to a right end portion of the shaft 8. The compressor impeller 10 is received in the compressor housing 6 so as to be rotatable.

The compressor housing 6 has a suction port 11. The suction port 11 is opened on the right side of the turbocharger C. An air cleaner (not shown) is connected to the suction port 11. Further, under a state in which the bearing housing 2 and the compressor housing 6 are coupled to each other by the fastening bolt 5, a diffuser flow passage 12 is formed. The diffuser flow passage 12 is formed by opposed surfaces of the bearing housing 2 and the compressor housing 6. The diffuser flow passage 12 increases pressure of air. The diffuser flow passage 12 is annularly formed so as to extend from a radially inner side to a radially outer side of the shaft 8. The diffuser flow passage 12 communicates with the suction port 11 on the radially inner side of the shaft 8 through intermediation of the compressor impeller 10.

Further, the compressor housing 6 has a compressor scroll flow passage 13. The compressor scroll flow passage 13 has an annular shape. The compressor scroll flow passage 13 is positioned, for example, on the radially outer side of the shaft 8 with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is increased in pressure and speed during a course of flowing through blades of the compressor impeller 10. The air increased in speed and pressure is increased in pressure (pressure recovery) in the diffuser flow passage 12 and the compressor scroll flow passage 13. The air increased in pressure is introduced to the engine.

Further, under a state in which the bearing housing 2 and the turbine housing 4 are coupled to each other by the fastening bolt 3, a clearance 14 is formed between opposed surfaces of the bearing housing 2 and the turbine housing 4. The clearance 14 is a space in which a flow passage "x" is arranged. Nozzle vanes 62, which are described later, are arranged in the flow passage "x". The flow passage "x" allows exhaust gas to flow therethrough. The clearance 14 is annularly formed so as to extend from a radially inner side of the shaft 8 (turbine impeller 9) toward an outer side.

Further, the turbine housing 4 has a discharge port 16. The discharge port 16 communicates with the turbine scroll flow passage 15 through the turbine impeller 9. The discharge port 16 faces a front side of the turbine impeller 9. The discharge port 16 is connected to an exhaust gas purification device (not shown).

The turbine scroll flow passage 15 communicates with a gas inflow port (not shown). Exhaust gas discharged from the engine is introduced to the gas inflow port. The turbine scroll flow passage 15 communicates also with the flow passage "x" described above. Thus, the exhaust gas introduced through the gas inflow port to the turbine scroll flow passage 15 is introduced to the discharge port 16 through the flow passage "x" and the turbine impeller 9. That is, the flow passage "x" is a passage which extends from the turbine scroll flow passage 15 to the turbine impeller 9. The exhaust gas causes the turbine impeller 9 to rotate during a course of flowing. Then, a rotational force of the turbine impeller 9 described above is transmitted to the compressor impeller 10 through the shaft 8. The air is increased in pressure by the rotational force of the compressor impeller 10, and is introduced to the suction port of the engine.

At this time, when the flow rate of the exhaust gas introduced to the turbine housing 4 changes, the rotation amounts of the turbine impeller 9 and the compressor impeller 10 change. In some cases, depending on an operating condition of the engine, the air increased in pressure to a desired pressure cannot sufficiently be introduced to the suction port of the engine. In view of the above-mentioned circumstance, a nozzle drive mechanism 20 is provided to the turbocharger C.

The nozzle drive mechanism 20 changes a flow passage width (nozzle throat width to be described later) of the flow passage "x" of the turbine housing 4. The nozzle drive mechanism 20 changes the flow speed of the exhaust gas introduced to the turbine impeller 9 in accordance with a flow rate of the exhaust gas. Specifically, when the rotation speed of the engine is low, and the flow rate of the exhaust gas is small, the nozzle drive mechanism 20 decreases a degree of opening of the flow passage "x" to increase the flow speed of the exhaust gas introduced to the turbine impeller 9. In this manner, the turbine impeller 9 can be rotated even with a small flow rate. Now, description is made of a configuration of the nozzle drive mechanism 20.

The nozzle drive mechanism 20 includes a shroud ring 21 and a nozzle ring 22. The shroud ring 21 is provided on the turbine housing 4 side. The nozzle ring 22 is provided on the bearing housing 2 side so as to be opposed to the shroud ring 21. The flow passage "x" is defined and formed by the shroud ring 21 and the nozzle ring 22.

The shroud ring 21 includes a main body portion 21a. The main body portion 21a has a thin-plate ring shape. The nozzle ring 22 includes a main body portion 22a. The main body portion 22a has a thin-plate ring shape. The main body portion 22a has a diameter which is equal to a diameter of the main body portion 21a of the shroud ring 21. The nozzle ring 22 is, for example, arranged so as to be opposed to the shroud ring 21 while maintaining a predetermined interval.

Figure 2A:
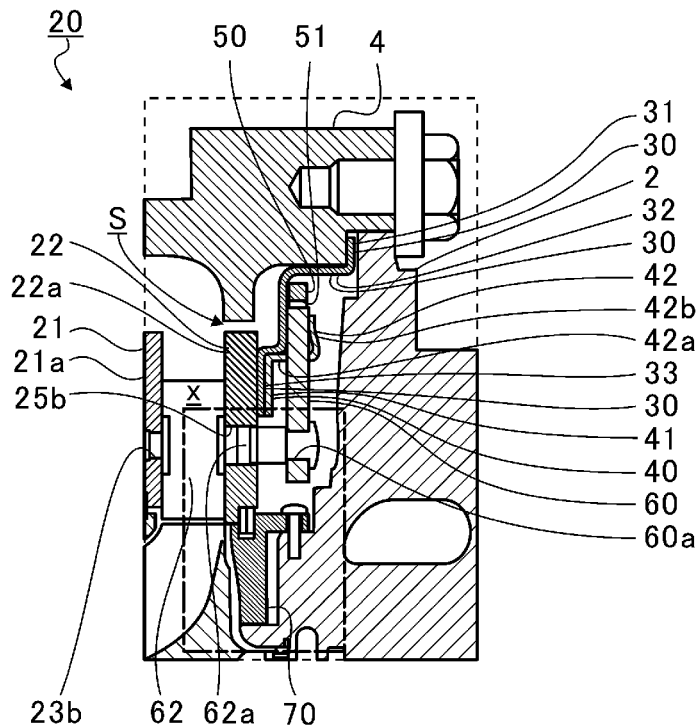
FIG. 2A is an extraction view of the broken line portion on an upper side in FIG. 1.
Figure 2B:
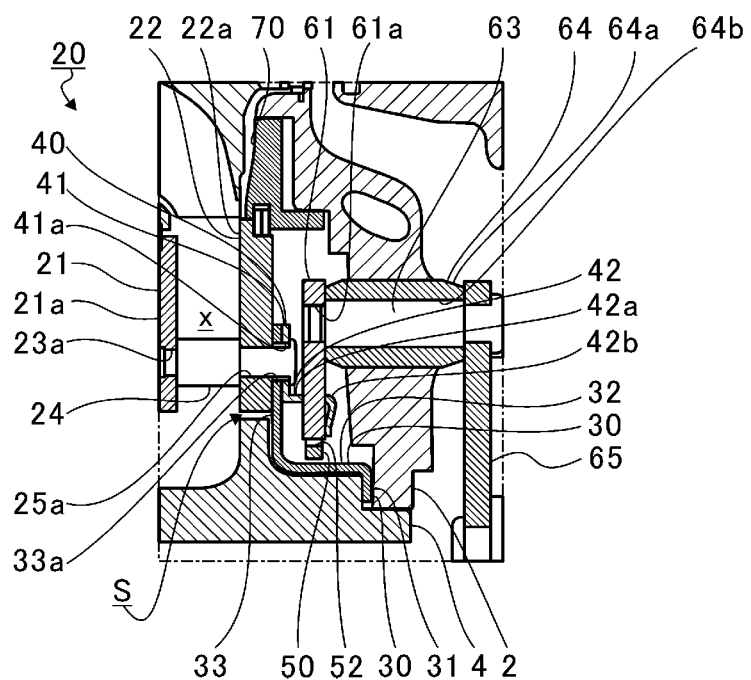
FIG. 2B is an extraction view of the one-dot chain line portion on a lower side in FIG. 1.

FIG. 2A is an extraction view of a broken line portion on an upper side in FIG. 1. FIG. 2B is an extraction view of a one-dot chain line portion on a lower side in FIG. 1. As illustrated in FIG. 2B, a pin shaft bottomed hole 23a is formed in a surface of the main body portion 21a of the shroud ring 21, which is opposed to the nozzle ring 22. A plurality of (three in this embodiment, but only one is shown in FIG. 2B) pin shaft bottomed holes 23a are formed at equal intervals in a circumferential direction.

Further, a pin shaft through hole 25a is formed in the main body portion 22a of the nozzle ring 22. The pin shaft through hole 25a penetrates through the main body portion 22a in a thickness direction (axial direction of the shaft 8). A plurality of (three in this embodiment, but only one in FIG. 2B) pin shaft through holes 25a are formed at equal intervals in a circumferential direction. The pin shaft bottomed hole 23a formed in the shroud ring 21 and the pin shaft through hole 25a formed in the nozzle ring 22 are opposed to each other. A coupling pin 24 is inserted into each of the pin shaft bottomed hole 23a and the pin shaft through hole 25a.

Specifically, as illustrated in FIG. 2B, one end of the coupling pin 24 is inserted into the pin shaft through hole 25a of the nozzle ring 22. Another end of the coupling pin 24 is inserted into the pin shaft bottomed hole 23a of the shroud ring 21. A plurality of (three in this embodiment, but only one in FIG. 2B) coupling pins 24 are arrayed at equal intervals in a circumferential direction. The coupling pin 24 maintains a constant interval between the nozzle ring 22 and the shroud ring 21 opposed to each other.

Further, the one end of the coupling pin 24 which is inserted into the pin shaft through hole 25a of the nozzle ring 22 projects toward the right side from the nozzle ring 22. The projecting part of the coupling pin 24 is caulked. In this manner, the support ring 30 and the guide ring 40 are mounted to the right side of the nozzle ring 22. The support ring 30 is formed of a cylindrical member. The support ring 30 has a sectional shape obtained by bending a member having a thin-plate shape (see FIG. 1).

Figure 3:
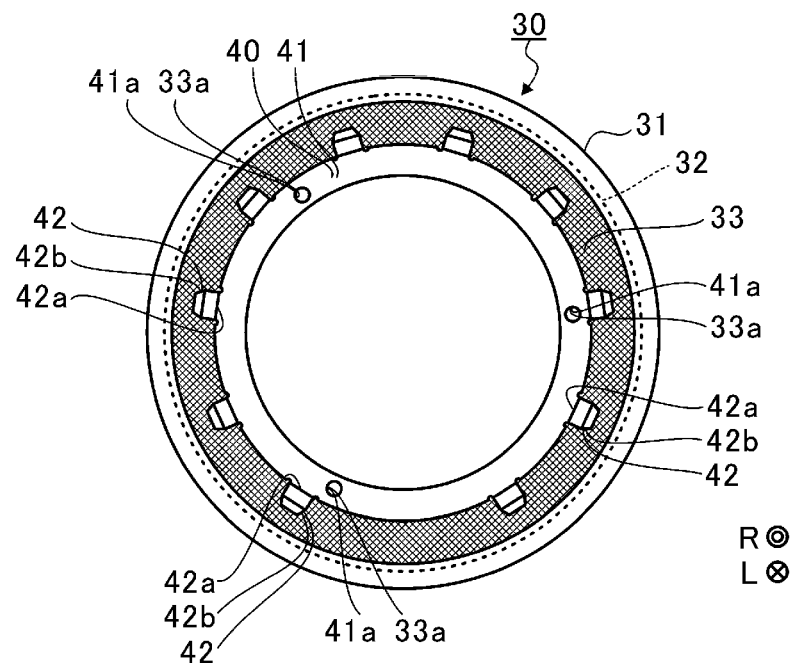
FIG. 3 is a plan view of a support ring and a guide ring.

FIG. 3 is a plan view of the support ring 30 and the guide ring 40. The near side in the drawing sheet of FIG. 3 is oriented toward the right side in FIG. 2A and FIG. 2B. The far side in the drawing sheet of FIG. 3 is oriented toward the left side in FIG. 2A FIG. 2B. As illustrated in FIG. 2A and FIG. 2B, the support ring 30 includes a flange portion 31, a cylindrical portion 32, and a bottom portion 33 (indicated by cross-hatching in FIG. 3). The flange portion 31 has an annular shape. The cylindrical portion 32 stands toward the left side (far side in FIG. 3) from the inner peripheral edge of the flange portion 31. The bottom portion 33 is bent toward the radially inner side from a left end portion of the cylindrical portion 32.

As illustrated in FIG. 2A and FIG. 2B, the flange portion 31 is sandwiched between opposed surfaces of the bearing housing 2 and the turbine housing 4. In this state, the bearing housing 2 and the turbine housing 4 are fastened by the fastening bolt 3 so that the support ring 30 is retained in the turbine housing 4.

The guide ring 40 includes a main body portion 41 of an annular shape. An inner diameter of the main body portion 41 of the guide ring 40 is approximately equal to an inner diameter of the bottom portion 33 of the support ring 30. The main body portion 41 is arranged on a radially inner side of the cylindrical portion 32 in a state of being held in abutment against the bottom portion 33. In FIG. 3, the bottom portion 33 of the support ring 30 on the radially inner side is partially hidden behind the main body portion 41 of the guide ring 40.

As illustrated in FIG. 3, the bottom portion 33 of the support ring 30 has ring through holes 33a. The ring through holes 33a are each capable of receiving one end of the coupling pin 24 which mentioned above inserted thereinto. The ring through holes 33a are formed at three locations at equal intervals in a circumferential direction. Moreover, in the main body portion 41 of the guide ring 40, guide through holes 41a are formed at three locations. The guide through holes 41a are opposed to the ring through holes 33a. The guide through holes 41a each receive one end of the coupling pin 24 inserted thereinto. The coupling pin 24 is inserted into the ring through hole 33a and the guide through hole 41a and then caulked. In such a manner, the support ring 30, the shroud ring 21, the nozzle ring 22, and the guide ring 40 are coupled. That is, the shroud ring 21 and the nozzle ring 22 are retained in the turbine housing 4 through intermediation of the support ring 30.

Further, as illustrated in FIG. 3, support pieces 42 are provided to the main body portion 41 of the guide ring 40. A plurality of (ten in this embodiment) support pieces 42 are arrayed apart from each other in the circumferential direction of the main body portion 41. As illustrated in FIG. 2A and FIG. 2B, the support pieces 42 each include a support portion 42a and a removal prevention portion 42b. The support portion 42a is bent toward the right side (near side in FIG. 3) from the main body portion 41. The removal prevention portion 42b is bent toward the radially outer side from the support portion 42a. The removal prevention portion 42b is arranged apart from the main body portion 41 by a predetermined distance and faces the main body portion 41. A drive ring 50 is rotatably supported by the support pieces 42 (see FIG. 4).

Figure 4:
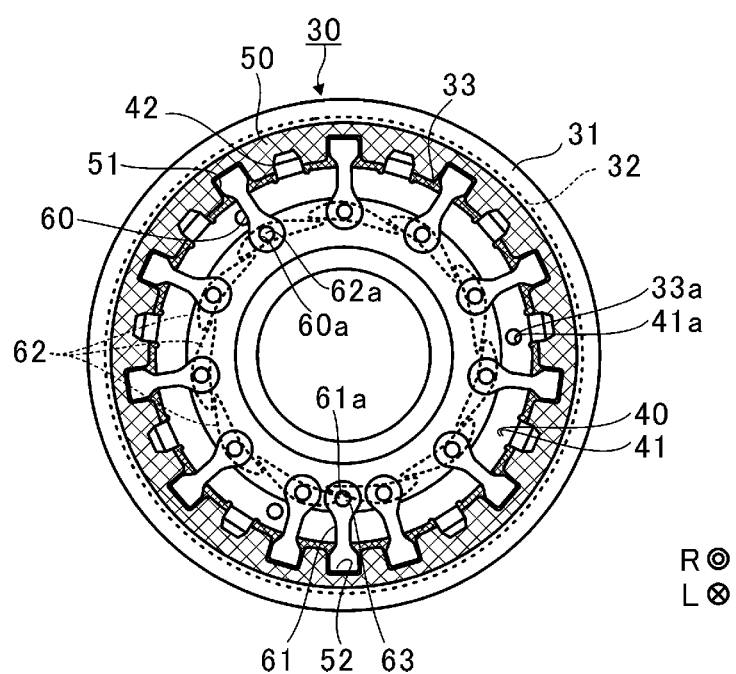
FIG. 4 is a view for illustrating a state in which a drive ring is supported by the guide ring.

FIG. 4 is a view for illustrating a state in which the drive ring 50 is supported by the guide ring 40. In FIG. 4, for easy understanding, the bottom portion 33 of the support ring 30 is indicated by cross-hatching. In FIG. 4, the drive ring 50 is indicated by cross-hatching rougher than that of the bottom portion 33.

The drive ring 50 is formed of an annular thin-plate member. The support portions 42a of the support pieces 42 are positioned on a radially inner side of the drive ring 50. The drive ring 50 is rotatably supported between the removal prevention portions 42b and portions of the bottom portion 33 recessed toward a side opposite to the nozzle ring 22 (illustrated in FIG. 2A, and provided at a plurality of locations in the circumferential direction), for example. As illustrated in FIG. 2A and FIG. 4, the drive ring 50 has engagement recess portions 51. A plurality of engagement recess portions 51 are formed along the circumferential direction. The engagement recess portions 51 are each formed by being cut out from an end portion of the drive ring 50 on an inner periphery side toward the radially outer side. One ends of transmission links 60 are engaged with the engagement recess portions 51.

Further, as illustrated in FIG. 2B and FIG. 4, one second engagement recess portion 52 is formed at the end portion of the drive ring 50 on the inner periphery side. The second engagement recess portion 52 has the same shape as the engagement recess portion 51. One end of the link plate 61 is engaged with the second engagement recess portion 52. The link plate 61 has the same shape as the transmission link 60.

A fitting through hole 60a is formed on another end side of each transmission link 60. A link through hole 61a is formed on another end side of the link plate 61. As illustrated in FIG. 2A, a blade shaft 62a is mounted to the fitting through hole 60a in a state of being inserted therein. The blade shaft 62a is mounted to the nozzle vane 62. As illustrated in FIG. 2B, a drive shaft 63 is fitted to the link through hole 61a of the link plate 61.

The blade shaft 62a is inserted into a blade shaft bottomed hole 23b and a blade shaft through hole 25b. The blade shaft 62a is axially supported by the blade shaft bottomed hole 23b and the blade shaft through hole 25b so as to be rotatable. The blade shaft bottomed hole 23b is formed on the radially inner side with respect to the pin shaft bottomed hole 23a in the main body portion 21a of the shroud ring 21. The blade shaft bottomed hole 23b is formed in a surface of the main body portion 21a which is opposed to the nozzle ring 22. A plurality of (eleven in this embodiment, but only one is shown in FIG. 2A) blade shaft bottomed holes 23b are formed along the circumferential direction of the main body portion 21a. The blade shaft bottomed holes 23b are formed, for example, at equal intervals in the circumferential direction of the main body portion 21a.

Similarly, the blade shaft through hole 25b is formed on the radially inner side with respect to the above-mentioned pin shaft through hole 25a in the main body portion 22a of the nozzle ring 22. The blade shaft through hole 25b penetrates through the main body portion 22a in the thickness direction (axial direction of the shaft 8). A plurality of (eleven in this embodiment, but only one is shown in FIG. 2A) blade shaft through holes 25b are formed in the circumferential direction of the main body portion 22a. The blade shaft through holes 25b are arranged, for example, at equal intervals in the circumferential direction of the main body portion 22a. The blade shaft bottomed holes 23b formed in the shroud ring 21 are arranged so as to be opposed to the blade shaft through holes 25b formed in the nozzle ring 22.

One end of the blade shaft 62a which is inserted into the blade shaft through hole 25b of the nozzle ring 22 projects toward the right side from the nozzle ring 22. The one end of the blade shaft 62a is inserted into the fitting through hole 60a of the transmission link 60. The projecting part at one end of the blade shaft 62a is caulked. In such a manner, the transmission link 60 is fixed to the blade shaft 62a.

In such a manner, the blade shafts 62a and the nozzle vanes 62 are arranged in the flow passage "x". The plurality of blade shafts 62a are annularly arrayed apart from each other in the rotation direction of the turbine impeller 9. The plurality of nozzle vanes 62 are annularly arrayed apart from each other in the rotation direction of the turbine impeller 9. As illustrated in FIG. 2B, the drive shaft 63 extends toward the right side from the drive ring 50. The extending portion of the drive shaft 63 is inserted into the bearing 64. In detail, the bearing 64 includes a main body portion 64a of an annular shape. An inner peripheral surface of a bearing through hole 64b of the main body portion 64a serves as a bearing surface. The drive shaft 63 is inserted into the bearing through hole 64b.

Further, a drive lever 65 is coupled to another end of the drive shaft 63. An actuator 66 is provided outside a housing of the turbocharger C (see FIG. 1). The drive lever 65 is coupled to the actuator 66. When the actuator 66 drives the drive lever 65, as illustrated in FIG. 2B, the drive lever 65 and the drive shaft 63 swing (rotate) about an axial center of the drive shaft 63 as a rotation center. The rotation power from the actuator 66 is transmitted to the link plate 61. In such a manner, the link plate 61 is swung.

The second engagement recess portion 52 is pressed by the link plate 61 illustrated in FIG. 4. The drive ring 50 rotates. When the drive ring 50 rotates, the transmission links 60 engaged respectively with the plurality of engagement recess portions 51 are pressed and swung. Along with the swinging of the transmission links 60, the plurality of blade shafts 62a rotate. Along with the rotation of the blade shafts 62a, the plurality of nozzle vanes 62 change respective angles in the flow passage "x". In such a manner, the nozzle drive mechanism 20 causes the link plate 61 to swing by the power of the actuator 66. Thus, the nozzle drive mechanism 20 synchronously changes respective angles of the plurality of nozzle vanes 62. The nozzle drive mechanism 20 is capable of variably changing the flow passage width (so-called nozzle throat width) of adjacent nozzle vanes 62. That is, the nozzle drive mechanism 20 adjusts an opening degree of the nozzle vanes 62, to thereby variably change a flow passage area of the flow passage "x".

Figure 5:
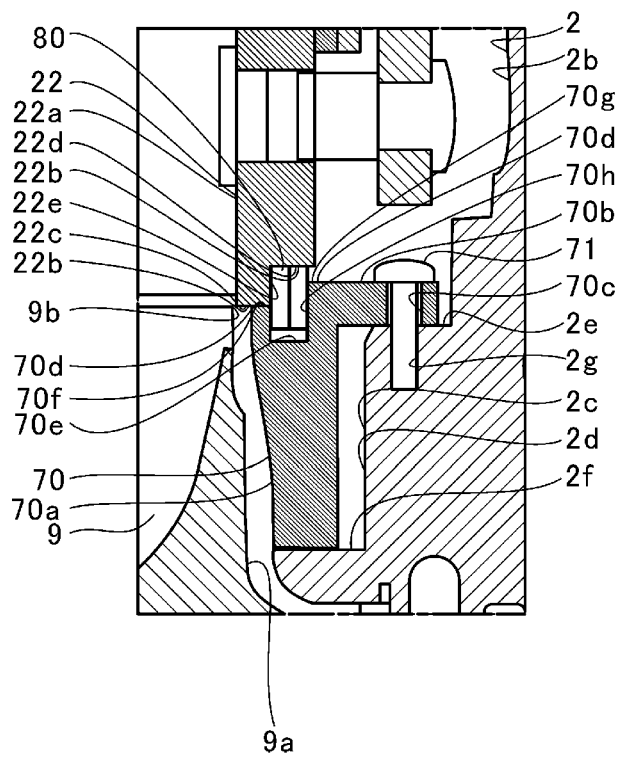
FIG. 5 is an extraction view of the two-dot chain line portion in FIG. 2A.

FIG. 5 is an extraction view of the two-dot chain line portion in FIG. 2A. As illustrated in FIG. 5, a wall surface 2b of the bearing housing 2 on the turbine impeller 9 side has a separation wall surface 2c. A position of the separation wall surface 2c in the radial direction of the shaft 8 is on an inner side with respect to an outer periphery 9b of the back surface 9a (surface on a side opposite to the discharge port 16) of the turbine impeller 9. The separation wall surface 2c is separated from the back surface 9a in the axial direction of the shaft 8.

A heat-shielding plate 70 is arranged between the back surface 9a of the turbine impeller 9 and the separation wall surface 2c of the bearing housing 2. The heat-shielding plate 70 is configured to suppress transfer of heat from the turbine impeller 9 side to the radial bearing 7 side.

In detail, the heat-shielding plate 70 includes a main body portion 70a (separation portion) of an annular shape. The heat-shielding plate 70 has a projecting portion 70b. The projecting portion 70b projects from the radially outer side of the main body portion 70a toward the wall surface 2b side of the bearing housing 2. The projecting portion 70b has a cylindrical shape.

Further, the wall surface 2b of the bearing housing 2 has an annular projection 2d (fitting portion). The annular projection 2d projects toward the back surface 9a side of the turbine impeller 9. A distal end portion 2f of the annular projection 2d on a distal end side has an outer diameter smaller than that of a base end portion 2e of the annular projection 2d on a base end side. The base end portion 2e is inserted along an inner periphery side of the projecting portion 70b of the heat-shielding plate 70. The distal end portion 2f is inserted along an inner periphery side of the main body portion 70a of the heat-shielding plate 70.

The projecting portion 70b has an insertion through hole 70c (insertion portion). The insertion through hole 70c penetrates through the projecting portion 70b in the radial direction. The base end portion 2e has a threaded hole 2g formed at a position opposed to the insertion through hole 70c. The threaded hole 2g is coaxial with the insertion through hole 70c. That is, axial centers of the insertion through hole 70c and the threaded hole 2g are orthogonal to the axial direction of the shaft 8.

It is only required that the axial centers of the insertion through hole 70c and the threaded hole 2g intersect the axial direction of the shaft 8. For example, the axial centers of the insertion through hole 70c and the threaded hole 2g may be orthogonal to the axial direction of the shaft 8, or may be inclined with respect to the axial direction. The axial centers of the insertion through hole 70c and the threaded hole 2g may be inclined toward the bearing housing 2 side (right side in FIG. 5) on the radially outer side of the shaft 8. The axial centers of the insertion through hole 70c and the threaded hole 2g may be inclined toward the bearing housing 2 side on the radially inner side of the shaft 8.

A fastening member 71 is formed of, for example, a bolt. The fastening member 71 is inserted into the insertion through hole 70c from an outer periphery side of the projecting portion 70b. The heat-shielding plate 70 is fastened to the bearing housing 2 by threadedly engaging the fastening member 71 with the threaded hole 2g.

In the foregoing, description is made of the example in which the fastening member 71 is formed of a bolt. However, a pin may be used as the fastening member 71. In such case, a hole having no thread groove is formed in place of the threaded hole 2g. The heat-shielding plate 70 may be fastened to the bearing housing 2 by press-fitting the pin into the hole having no thread groove.

The main body portion 70a of the heat-shielding plate 70 is separated with respect to the separation wall surface 2c (base end portion 2e of the annular projection 2d) of the bearing housing 2 in the axial direction of the shaft 8.

In this embodiment, the heat-shielding plate 70 is mounted to the bearing housing 2 without being sandwiched. The main body portion 70a of the heat-shielding plate 70 is separated from the separation wall surface 2c of the bearing housing 2. A heat-insulating layer of air is formed between the main body portion 70a and the separation wall surface 2c. Therefore, as compared to a case in which the heat-shielding plate 70 is mounted to the bearing housing 2, and the nozzle ring 22 is pressed by the heat-shielding plate 70 being pressed by, for example, the spring member, the heat-shielding characteristic can be improved while avoiding degradation in operation characteristic of the nozzle vanes 62.

Further, an outer peripheral surface 70d of the main body portion 70a has an annular groove 70e. A small-diameter portion 70f is formed in the outer peripheral surface 70d on the left side in FIG. 5 with respect to the annular groove 70e. A large-diameter portion 70g is formed in the outer peripheral surface 70d on the right side in FIG. 5. The large-diameter portion 70g has an outer diameter larger than that of the small-diameter portion 70f. A step surface 70h is formed between the annular groove 70e and the large-diameter portion 70g. The step surface 70h extends in the radial direction of the main body portion 70a.

Further, an inner peripheral surface 22b of the main body portion 22a of the nozzle ring 22 has a small-inner-diameter portion 22c and a large-inner-diameter portion 22d. The small-inner-diameter portion 22c is opposed to the small-diameter portion 70f of the heat-shielding plate 70 in the radial direction. The large-inner-diameter portion 22d is opposed to the annular groove 70e in the radial direction. A step surface 22e is formed between the small-inner-diameter portion 22c and the large-inner-diameter portion 22d. The step surface 22e extends in the radial direction of the main body portion 70a.

A seal ring 80 is fitted to the annular groove 70e. The seal ring 80 has an outer diameter which is slightly larger than an inner diameter of the large-inner-diameter portion 22d of the nozzle ring 22. The seal ring 80 is press-fitted into the large-inner-diameter portion 22d. Further, a slight clearance is formed between the seal ring 80 and the step surface 70h of the heat-shielding plate 70. A slight clearance is formed between the seal ring 80 and the step surface 22e of the nozzle ring 22.

An elastic force of the seal ring 80 causes the outer peripheral surface of the seal ring 80 to be pressed against the large-inner-diameter portion 22d in the radial direction. The seal ring 80 is pressed by gas pressure against one of the two step surfaces 70h and 22e. In such a manner, sealability is enhanced.

The exhaust gas having flowed into the turbine scroll flow passage 15 may slightly leak out to the support ring 30 side through a clearance S (see FIG. 2A and FIG. 2B) which is further upstream of the flow passage "x". The exhaust gas having leaked out to the support ring 30 side may detour on the right side in FIG. 2A and FIG. 2B of the support ring 30 and flow out to the back surface 9a side of the turbine impeller 9. Such flow of the exhaust gas is suppressed by providing the seal ring 80. Degradation in turbine efficiency can be suppressed.

Figure 6:
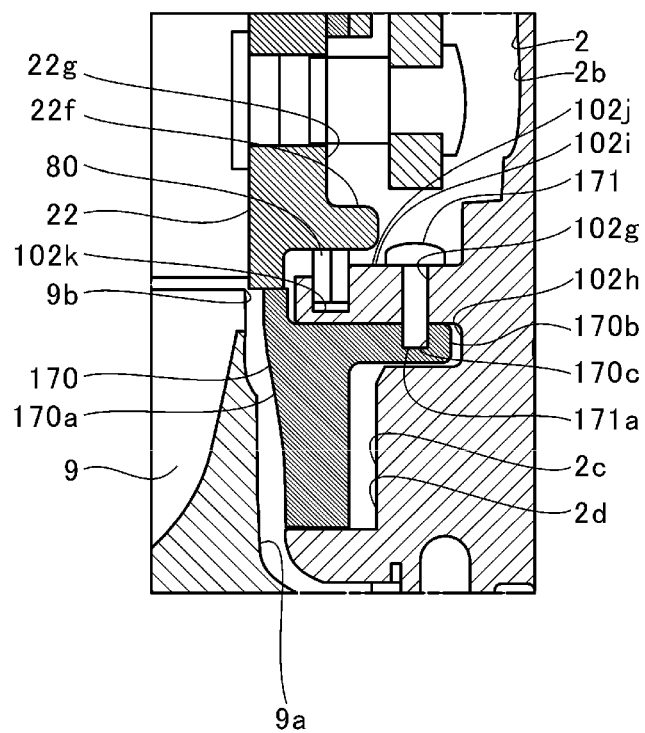
FIG. 6 is a first explanatory view for illustrating a first modification example.

FIG. 6 is a first explanatory view for illustrating a first modification example. FIG. 6 is an illustration of a cross section of the first modification example at a position corresponding to FIG. 2A. As illustrated in FIG. 6, in the first modification example, an annular groove 102h is formed. The annular groove 102h is formed on an outer periphery side (outer periphery side of the annular projection 2d) of the separation wall surface 2c of the bearing housing 2. On an outer periphery side of the annular groove 102h, a large-diameter projection 102i (projection portion) is formed. The large-diameter projection 102i has an annular shape. The large-diameter projection 102i forms a wall portion of the annular groove 102h on the outer periphery side.

The large-diameter projection 102i projects toward the turbine impeller 9 side with respect to the separation wall surface 2c. The nozzle ring 22 has an inner projecting portion 22f. The inner projecting portion 22f is formed on an end surface 22g of the main body portion 22a on the transmission link 60 side. The inner projecting portion 22f is formed on a radially inner side of the end surface 22g. The inner projecting portion 22f projects toward the transmission link 60 side (right side in FIG. 6). The large-diameter projection 102i projects toward the turbine impeller 9 side with respect to the end surface 22g of the nozzle ring 22. The large-diameter projection 102i is opposed to the inner projecting portion 22f in the radial direction.

In the above-mentioned embodiment, description is made of the case in which the seal ring 80 is arranged between the nozzle ring 22 and the heat-shielding plate 70. In the first modification example, the seal ring 80 is arranged between the inner projecting portion 22f of the nozzle ring 22 and the large-diameter projection 102i of the bearing housing 2.

An outer peripheral surface 102j of the large-diameter projection 102i has a seal groove 102k. The seal groove 102k is opposed to the inner projecting portion 22f in the radial direction. The seal groove 102k is positioned on the radially inner side of the inner projecting portion 22f. An outer diameter of the outer peripheral surface 102j which continues toward a distal end side (turbine impeller 9 side) of the large-diameter projection 102i with respect to the seal groove 102k is smaller than an outer diameter of the outer peripheral surface 102j which continues toward a base end side (side separating from the turbine impeller 9) of the large-diameter projection 102i with respect to the seal groove 102k. In other words, an outer diameter of a side wall surface of the seal groove 102k on the turbine impeller 9 side is smaller than an outer diameter of a side wall surface on the compressor impeller 10 side.

The seal ring 80 is arranged in the seal groove 102k. An outer diameter of the seal ring 80 is slightly larger than an inner diameter of the inner projecting portion 22f. The seal ring 80 is press-fitted into the inner projecting portion 22f. Similarly to the first modification example described above, the seal ring 80 suppresses a flow of the exhaust gas flowing out toward the back surface 9a side of the turbine impeller 9. Degradation in turbine efficiency can be suppressed.

Further, the seal groove 102k to which the seal ring 80 is fitted is formed in the large-diameter projection 102i. Therefore, as compared to the case in which the seal ring 80 is fitted to the heat-shielding plate 170, the structure of the heat-shielding plate 170 is prevented from being complicated. Manufacturing cost for the heat-shielding plate 170 is reduced.

Further, the heat-shielding plate 170 has a projecting portion 170b. The projecting portion 170b projects from a main body portion 170a (separation portion) toward the right side in FIG. 6 (side opposite to the turbine impeller 9). The projecting portion 170b is inserted into the annular groove 102h of the bearing housing 2.

The projecting portion 170b has an insertion bottomed hole 170c (insertion portion). The large-diameter projection 102i has a penetrating hole 102g. The penetrating hole 102g is formed at a position opposed to the insertion bottomed hole 170c. The penetrating hole 102g is opposed to the radially outer side of the shaft 8 with respect to the insertion bottomed hole 170c. That is, axial centers of the insertion bottomed hole 170c and the penetrating hole 102g are orthogonal to the axial direction of the shaft 8.

It is only required that the axial centers of the insertion bottomed hole 170c and the penetrating hole 102g intersect the axial direction of the shaft 8. For example, the axial centers of the insertion bottomed hole 170c and the penetrating hole 102g may be orthogonal to the axial direction of the shaft 8, or may be inclined with respect to the axial direction. The axial centers of the insertion bottomed hole 170c and the penetrating hole 102g may be inclined toward the bearing housing 2 side (right side in FIG. 6) on the radially outer side of the shaft 8. The axial centers of the insertion bottomed hole 170c and the penetrating hole 102g may be inclined toward the bearing housing 2 side on the radially inner side of the shaft 8.

A fastening member 171 is press-fitted into the penetrating hole 102g. A distal end 171a of the fastening member 171 is press-fitted into the insertion bottomed hole 170c. In this case, the fastening member 171 is formed of a pin. Now, detailed description is made of processing of press-fitting the fastening member 171 into the penetrating hole 102g and the insertion bottomed hole 170c.

Figure 7A:
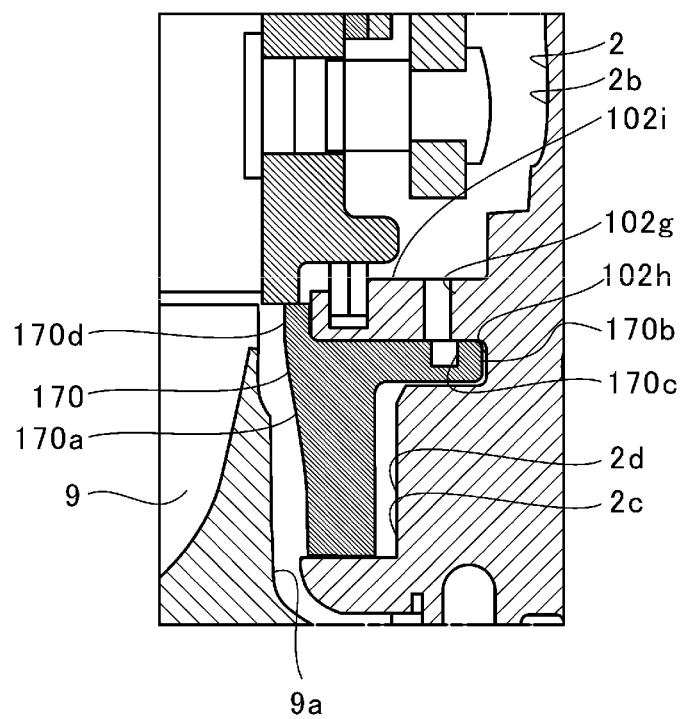
FIG. 7A is a second explanatory view for illustrating the first modification example.
Figure 7B:
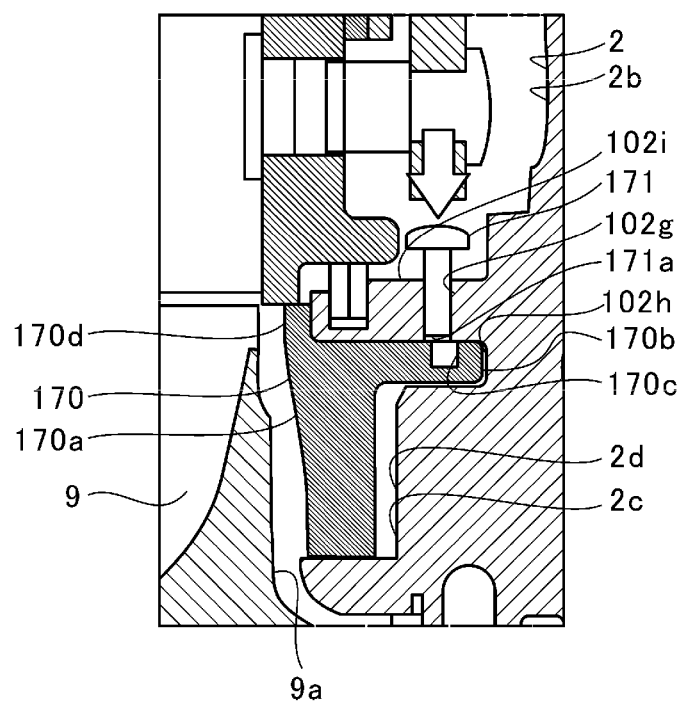
FIG. 7B is a third explanatory view for illustrating the first modification example.

FIG. 7A is a second explanatory view for illustrating the first modification example. FIG. 7B is a third explanatory view for illustrating the first modification example. As illustrated in FIG. 7A and FIG. 7B, the heat-shielding plate 170 has an opposing portion 170d. The opposing portion 170d projects from the main body portion 170a toward an upper side in FIG. 7A and FIG. 7B (radially outer side). The opposing portion 170d is opposed to the large-diameter projection 102i of the bearing housing 2 in the axial direction of the shaft 8.

As illustrated in FIG. 7A, the opposing portion 170d is designed so that the opposing portion 170d is brought into abutment against a distal end of the large-diameter projection 102i when the projecting portion 170b of the heat-shielding plate 170 is inserted into the annular groove 102*h* of the bearing housing 2. At this time, the axial center of the insertion bottomed hole 170*c* of the projecting portion 170*b* is shifted with respect to the axial center of the penetrating hole 102*g* of the large-diameter projection 102*i*. Specifically, the axial center of the insertion bottomed hole 170*c* is positioned on the right side in FIG. 7A with respect to the axial center of the penetrating hole 102*g*.

In other words, when the projecting portion 170*b* is inserted into the annular groove 102*h* to such an extent that the opposing portion 170*d* of the heat-shielding plate 170 is brought into abutment against the distal end of the large-diameter projection 102*i*, the axial center of the insertion bottomed hole 170*c* is shifted toward a far side in the insertion direction (right side in FIG. 7A) with respect to the axial center of the penetrating hole 102*g*.

While the heat-shielding plate 170 is pressed in the insertion direction in this state, the fastening member 171 is press-fitted into the penetrating hole 102*g* as illustrated in FIG. 7B. The distal end 171*a* of the fastening member 171 is press-fitted into the insertion bottomed hole 170*c*. As a result, the heat-shielding plate 170 is shifted toward the left side in FIG. 7B so that the axial center of the insertion bottomed hole 170*c* matches with the axial center of the fastening member 171. The main body portion 170*a* is separated in the axial direction of the shaft 8 from the separation wall surface 2*c* (annular projection 2*d*) to be brought into the state illustrated in FIG. 6.

In such a manner, the heat-shielding plate 170 is mounted to the bearing housing 2 by the fastening member 171. Similarly to the above-mentioned embodiment, a heat-insulating layer of air is formed between the main body portion 170*a* and the separation wall surface 2*c*. The heat-shielding characteristic can be improved.

Figure 8:
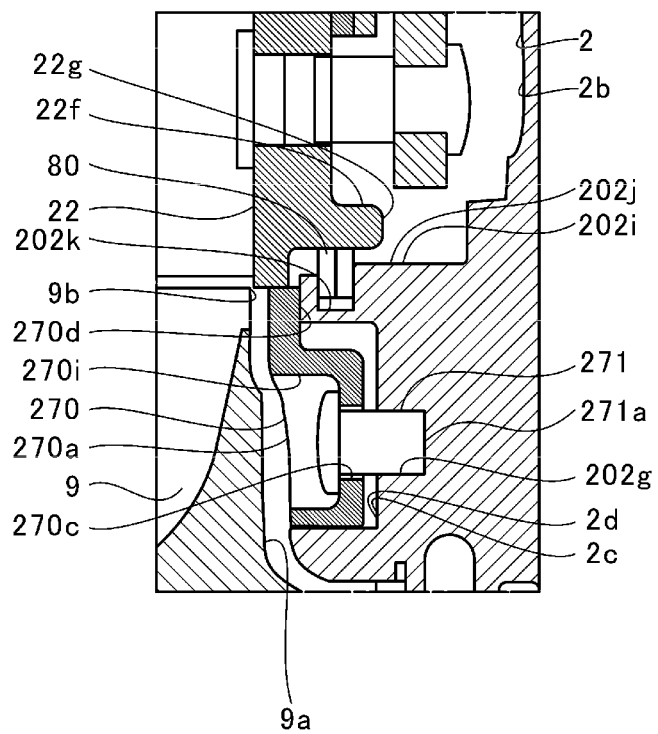
FIG. 8 is an explanatory view for illustrating a second modification example.

FIG. 8 is an explanatory view for illustrating a second modification example. FIG. 8 is an illustration of a cross section of the second modification example at a position corresponding to FIG. 2A. In the above-mentioned embodiment and first modification example, description is made of the case in which the axial centers of the insertion through hole 70*c* and the insertion bottomed hole 170*c* extend in the radial direction of the shaft (direction orthogonal to the axial direction). In the second modification example, an axial center of an insertion through hole 270*c* (insertion portion) extends in the axial direction of the shaft 8.

Specifically, a recessed portion 270*i* is formed in a surface of a main body portion 270*a* (separation portion) of the heat-shielding plate 270 on the turbine impeller 9 side. In a bottom surface of the recessed portion 270*i*, the insertion through hole 270*c* is opened. The insertion through hole 270*c* penetrates through the main body portion 270*a* in the axial direction of the shaft 8. The annular projection 2*d* of the bearing housing 2 has a press-fitting bottomed hole 202*g*. The press-fitting bottomed hole 202*g* is formed at a position opposed to the insertion through hole 270*c*. The insertion through hole 270*c* and the press-fitting bottomed hole 202*g* are arranged so as to be coaxial with each other.

The insertion through hole 270*c* and the press-fitting bottomed hole 202*g* may penetrate through the main body portion 270*a* in a direction of intersecting the axial direction of the shaft 8. For example, the axial centers of the insertion through hole 270*c* and the press-fitting bottomed hole 202*g* may be inclined with respect to the axial direction of the shaft 8. The axial centers of the insertion through hole 270*c* and the press-fitting bottomed hole 202*g* may be inclined toward the radially outer side of the shaft 8 on the bearing housing 2 side (right side in FIG. 8). The axial centers of the insertion through hole 270*c* and the press-fitting bottomed hole 202*g* may be inclined toward the radially inner side of the shaft 8 on the bearing housing 2 side.

Further, in the second modification example, a large-diameter projection 202*i* (projection portion) similar to that of the first modification example is formed. The large-diameter projection 202*i* continues along an outer periphery of the annular projection 2*d* of the bearing housing 2. The large-diameter projection 202*i* has an annular shape.

The large-diameter projection 202*i* projects toward the turbine impeller 9 side with respect to the separation wall surface 2*c*. The large-diameter projection 202*i* projects toward the turbine impeller 9 side with respect to the end surface 22*g* of the nozzle ring 22. The large-diameter projection 202*i* is opposed to the inner projecting portion 22*f* in the radial direction. An outer peripheral surface 202*j* of the large-diameter projection 202*i* has a seal groove 202*k*. The seal groove 202*k* is opposed to the inner projecting portion 22*f* in the radial direction. The seal groove 202*k* is positioned on the radially inner side of the inner projecting portion 22*f*. An outer diameter of the outer peripheral surface 202*j* which continues toward a distal end side (turbine impeller 9 side) of the large-diameter projection 202*i* with respect to the seal groove 202*k* is smaller than an outer diameter of the outer peripheral surface 202*j* which continues toward a base end side (side separating from the turbine impeller 9) of the large-diameter projection 202*i* with respect to the seal groove 202*k*.

The seal ring 80 is arranged in the seal groove 202*k*. An outer diameter of the seal ring 80 is slightly larger than an inner diameter of the inner projecting portion 22*f*. The seal ring 80 is press-fitted into the inner projecting portion 22*f*. Similarly to the first modification example described above, the seal ring 80 suppresses a flow of the exhaust gas flowing out toward the back surface 9*a* side of the turbine impeller 9. Degradation in turbine efficiency can be suppressed.

Further, the seal groove 202*k* to which the seal ring 80 is fitted is formed in the large-diameter projection 202*i*. Therefore, as compared to the case in which the seal ring 80 is fitted to the heat-shielding plate 270, the structure of the heat-shielding plate 270 is prevented from being complicated. Manufacturing cost for the heat-shielding plate 270 is reduced.

The main body portion 270*a* of the heat-shielding plate 270 has an opposing portion 270*d* similar to that of the first modification example. Distal ends of the opposing portion 270*d* and the large-diameter projection 202*i* are held in abutment against each other in the axial direction of the shaft 8.

Then, a fastening member 271 is inserted into the insertion through hole 270*c* of the main body portion 270*a* from the recessed portion 270*i* side. The fastening member 271 is formed of a pin. A distal end 271*a* of the fastening member 271 is press-fitted into a press-fitting bottomed hole 202*g* of the bearing housing 2. In such a manner, the heat-shielding plate 270 is mounted to the bearing housing 2.

At this time, at a position at which the opposing portion 270*d* of the heat-shielding plate 270 is held in abutment against the large-diameter projection 202*i* of the bearing housing 2, a position of the main body portion 270*a* of the heat-shielding plate 270 is regulated. As a result, the main body portion 270*a* is separated in the axial direction of the shaft 8 from the separation wall surface 2*c* (annular projection 2*d*) of the bearing housing 2. Similarly to the above-mentioned embodiment, the heat-shielding characteristic can be improved.

Figure 9:
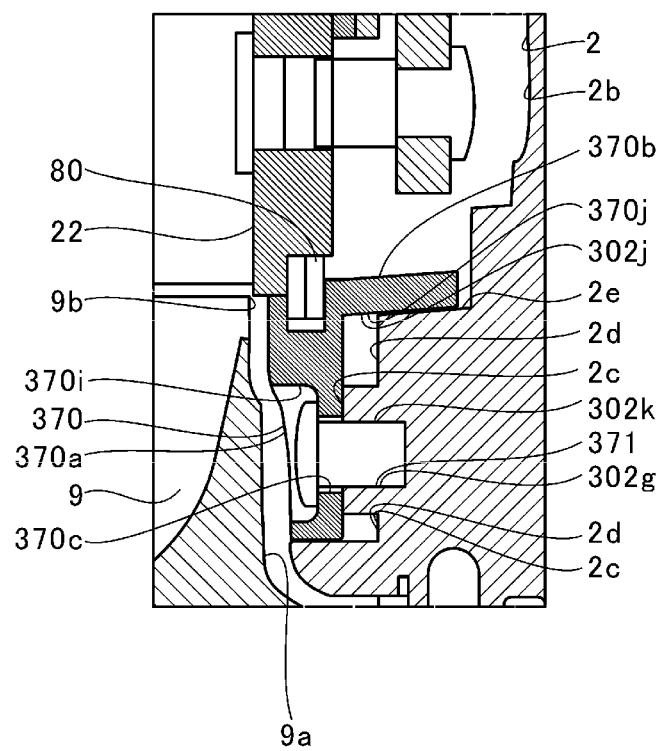
FIG. 9 is an explanatory view for illustrating a third modification example.

FIG. 9 is an explanatory view for illustrating a third modification example. FIG. 9 is an illustration of a cross section of the third modification example at a position corresponding to FIG. 2A. As illustrated in FIG. 9, in the third modification example, similarly to the above-mentioned second modification example, the recessed portion 370i and the insertion through hole 370c (insertion portion) are formed. The recessed portion 370i and the insertion through hole 370c are formed in the main body portion 370a (separation portion) of the heat-shielding plate 370.

On an outer periphery of the annular projection 2d (fitting portion), unlike the second modification example, the large-diameter projection 202i is not formed. Unlike the second modification example, in the third modification example, a threaded bottomed hole 302g is formed at the base end portion 2e of the annular projection 2d. The fastening member 371 is formed of, for example, a bolt. The fastening member 371 is inserted into the insertion through hole 370c. The fastening member 371 is inserted into the threaded bottomed hole 302g and threadedly engaged with the threaded bottomed hole 302g.

The main body portion 370a of the heat-shielding plate 370 has a projecting portion 370b which is similar to those of the above-mentioned embodiment and first modification example. The projecting portion 370b has a cylindrical shape. The projecting portion 370b has an inner peripheral surface 370j having an inclined shape of being inclined with respect to the axial direction of the shaft 8. The inner peripheral surface 370j is inclined in a direction in which an inner diameter increases as separating from the turbine impeller 9.

An outer peripheral surface 302j of the annular projection 2d has an inclined shape of being inclined along the inner peripheral surface 370j of the projecting portion 370b. That is, the outer peripheral surface 302j is inclined in a direction in which an outer diameter increases as separating from the turbine impeller 9. The annular projection 2d is inserted along the inner periphery side of the projecting portion 370b. That is, in the third modification example, the annular projection 2d is a fitting portion to be fitted along the inner periphery side of the projecting portion 370b.

As described above, the inner peripheral surface 370j of the projecting portion 370b and the outer peripheral surface 302j of the annular projection 2d each have the inclined shape. The projecting portion 370b and the annular projection 2d form a wedge structure. Therefore, a load acts on the heat-shielding plate 370 in a direction in which the annular projection 2d is removed from an inner periphery of the projecting portion 370b (left side in FIG. 9). As a result, an axial force acts on the fastening member 371. The fastening member 371 is less liable to be loosened.

Further, the base end portion 2e of the annular projection 2d has an abutment portion 302k. The abutment portion 302k is formed on a surface of the base end portion 2e on the turbine impeller 9 side. The abutment portion 302k is held in abutment against the main body portion 370a of the heat-shielding plate 370 in the axial direction of the shaft 8. The threaded bottomed hole 302g is formed in the abutment portion 302k. The separation wall surface 2c is formed on both of an inner side and an outer side in the radial direction of the shaft 8 with respect to the abutment portion 302k. The separation wall surface 2c is separated from the turbine impeller 9 with respect to the abutment portion 302k. That is, the abutment portion 302k projects toward the main body portion 370a side of the heat-shielding plate 370 from the separation wall surface 2c.

In such a manner, the main body portion 370a of the heat-shielding plate 370 is held in abutment against the abutment portion 302k. A position of the main body portion 370a in the axial direction of the shaft 8 is regulated by the abutment portion 302k. The main body portion 370a is at a position separated from the separation wall surface 2c. Similarly to the above-mentioned embodiment, the heat-shielding characteristic can be improved.

Figure 10:
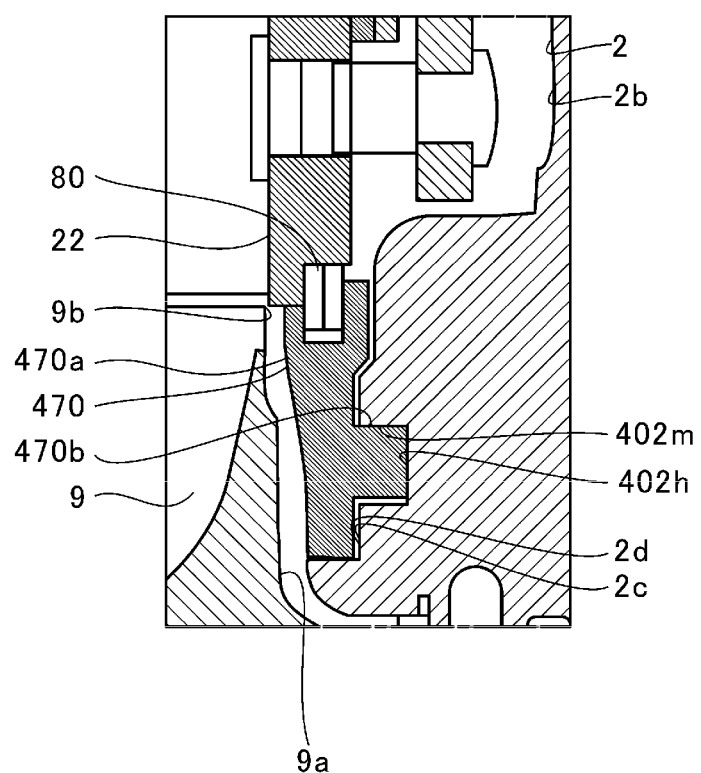
FIG. 10 is an explanatory view for illustrating a fourth modification example.

FIG. 10 is an explanatory view for illustrating a fourth modification example. FIG. 10 is an illustration of a cross section of the fourth modification example at a position corresponding to FIG. 2A. In the above-mentioned embodiment and modification examples, description is made of the case in which the heat-shielding plate 70, 170, 270, 370 is mounted to the bearing housing 2 with use of, for example, a bolt or a pin. In the fourth modification example, as illustrated in FIG. 10, a heat-shielding plate 470 is mounted to the bearing housing 2 without use of a bolt or a pin.

Specifically, the heat-shielding plate 470 has a projecting portion 470b. The projecting portion 470b has an annular shape. The projecting portion 470b projects from a main body portion 470a (separation portion) toward the bearing housing 2 side (right side in FIG. 10). That is, the projecting portion 470b projects from the main body portion 470a toward a side opposite to the turbine impeller 9. Further, the wall surface 2b of the bearing housing 2 has an annular groove 402h. The annular groove 402h is formed in the separation wall surface 2c of the annular projection 2d. The projecting portion 470b is inserted into the annular groove 402h.

In a state before the projecting portion 470b is inserted into the annular groove 402h, an inner diameter of a wall surface 402m of the annular groove 402h on an outer periphery side is slightly smaller than an outer diameter of the projecting portion 470b on an outer periphery side. Therefore, the projecting portion 470b is press-fitted into the annular groove 402h.

As described above, the projecting portion 470b formed on the heat-shielding plate 470 is press-fitted into the annular groove 402h. In such a manner, the heat-shielding plate 470 is mounted to the bearing housing 2. That is, the projecting portion 470b functions as mounting means.

Further, the projecting portion 470b is press-fitted into the annular groove 402h to such an extent that a distal end of the projecting portion 470b is brought into abutment against a bottom surface of the annular groove 402h. At this time, the main body portion 470a is separated from the separation wall surface 2c of the bearing housing 2 in the axial direction of the shaft 8. Movement of the main body portion 470a toward the separation wall surface 2c side is regulated by the projecting portion 470b. Thus, the main body portion 470a is maintained in the state of being separated from the separation wall surface 2c.

As described above, in the fourth modification example, the projecting portion 470b is press-fitted into the annular groove 402h without use of, for example, a bolt or a pin. In such a manner, the heat-shielding plate 470 is mounted to the bearing housing 2 under a state in which the main body portion 470a is separated from the separation wall surface 2c. Therefore, the number of components can be reduced, thereby being capable of reducing the cost. Similarly to the above-mentioned embodiment, the heat-shielding characteristic can be improved.

In the above-mentioned third modification example and fourth modification example, similarly to the embodiment described above, the seal ring 80 is arranged. The arrangement of the seal ring 80 is substantially the same as the configuration of the embodiment described above, and hence detail description is omitted to avoid redundant description.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment and modification examples, description is made of the case in which the nozzle drive mechanism 20 is provided. However, the nozzle drive mechanism 20 is not essentially required. In the case in which the nozzle drive mechanism 20 is provided, when the heat-shielding plate is thermally deformed, the nozzle ring is pressed by the heat-shielding plate, which may affect the operation characteristic of the nozzle vane 62. With the heat-shielding plate 70, 170, 270, 370, 470 mounted to the bearing housing 2, such degradation in operation characteristic can be avoided.

Further, in the above-mentioned first modification example, description is made of the case in which the fastening member 171 formed of a pin is press-fitted into the penetrating hole 102g. However, the fastening member 171 may be formed of a bolt, and a threaded bottomed hole may be formed in place of the penetrating hole 102g. The fastening member 171 may be inserted into the threaded bottomed hole and threadedly engaged with the threaded bottomed hole.

Further, in the above-mentioned second modification example, description is made of the case in which the fastening member 271 formed of a pin is press-fitted into the press-fitting bottomed hole 202g. However, the fastening member 271 may be formed of, for example, a bolt, and a threaded bottomed hole may be formed in place of the press-fitting bottomed hole 202g. The fastening member 271 may be inserted into the threaded bottomed hole and threadedly engaged with the threaded bottomed hole.

Further, in the above-mentioned first modification example, description is made of the case in which, when the projecting portion 170b of the heat-shielding plate 170 is inserted into the annular groove 102h of the bearing housing 2, the axial center of the insertion bottomed hole 170c is positioned on the right side in FIG. 7A with respect to the axial center of the penetrating hole 102g. However, the axial center of the insertion bottomed hole 170c may be slightly shifted toward the left side in FIG. 7A with respect to the axial center of the penetrating hole 102g. In this case, for example, when the distal end of the fastening member 171 is formed into a tapered shape, the heat-shielding plate 170 is rigidly mounted to the bearing housing 2 by a wedge effect.

In the above-mentioned fourth modification example, description is made of the case in which, in the state before the projecting portion 470b is inserted into the annular groove 402h, an inner diameter of the wall surface 402m of the annular groove 402h on the outer periphery side is slightly smaller than an outer diameter on the outer periphery side of the projecting portion 470b. However, it is not limited thereto. For example, a wall surface outer diameter of the annular groove 402h on the inner periphery side may be set slightly larger than an inner periphery side inner diameter of the projecting portion 470b. In this case, the inner peripheral surface of the projecting portion 470b is press-fitted into an inner periphery side wall of the annular groove 402h. Further, the outer diameter of the projecting portion 470b on the outer periphery side and the inner diameter of the projecting portion 470b on the inner periphery side may suitably be adjusted so that the projecting portion 470b is press-fitted along both the wall surface of the annular groove 402h on the inner periphery side and the wall surface 402m on the outer periphery side.

INDUSTRIAL APPLICABILITY

The present disclosure is usable for a turbocharger in which a heat-shielding plate is arranged between a back surface of a turbine impeller and a bearing housing.

What is claimed is:
1. A turbocharger, comprising:
 a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft; and
 a heat-shielding plate, including:
  a separation portion, which is separated from the separation wall surface in the axial direction, and is positioned between the back surface of the turbine impeller and the separation wall surface; and
  an insertion portion, which receives a fastening member inserted thereinto in a direction of intersecting the axial direction of the shaft,
 the heat-shielding plate being mounted to the bearing housing by the fastening member,
 wherein the heat-shielding plate does not contact the separation wall surface in the axial direction of the shaft.

2. The turbocharger according to claim 1, further comprising:
 a projecting portion, which is formed on the heat-shielding plate, projects from the separation portion toward a side opposite to the turbine impeller, and has the insertion portion;
 an annular groove, which is formed in the bearing housing, and receives the projecting portion inserted thereinto; and
 a penetrating hole, which is formed in a wall portion forming the annular groove, and is opposed to the insertion portion,
 wherein the fastening member is inserted from the penetrating hole, and a distal end of the fastening member is inserted into the insertion portion.

3. A turbocharger, comprising:
 a nozzle drive mechanism including a plurality of nozzle vanes;
 a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft;
 a projection portion, which is positioned on a radially outer side of the shaft with respect to the separation wall surface in a bearing housing, and is opposed to the nozzle drive mechanism from a radially inner side of the shaft, the projection portion being provided on the bearing housing;

a seal ring which is provided in a seal groove formed in an opposing surface of the projection portion with respect to the nozzle drive mechanism; and a heat-shielding plate, which includes a separation portion separated from the separation wall surface in the axial direction and positioned between a back surface of the turbine impeller and the separation wall surface, and is mounted to the bearing housing, wherein the heat-shielding plate does not contact the separation wall surface in the axial direction of the shaft.

4. The turbocharger according to claim 3, further comprising an insertion portion, which is formed in the heat-shielding plate, and receives a fastening member inserted thereinto in the axial direction of the shaft.

5. The turbocharger according to claim 3, further comprising:

an insertion portion, which is formed in the heat-shielding plate, and receives a fastening member inserted thereinto in a direction of intersecting the axial direction of the shaft, and a penetrating hole, which is formed in the projection portion, and is opposed to the insertion portion, wherein the penetrating hole receives the fastening member inserted thereinto.

6. The turbocharger according to claim 5, further comprising:

a projecting portion, which is formed on the heat-shielding plate, projects from the separation portion toward a side opposite to the turbine impeller, and has the insertion portion; and an annular groove, which is formed in the bearing housing, and receives the projecting portion inserted thereinto.

7. The turbocharger according to claim 1, further comprising:

a projecting portion, which is formed on the heat-shielding plate, projects from the separation portion toward a side opposite to the turbine impeller, and has an inner peripheral surface having an inclined shape of being inclined with respect to the axial direction of the shaft; and a fitting portion, which is formed on the bearing housing, projects from a wall surface on the turbine impeller side toward the separation portion side, has an outer peripheral surface having an inclined shape of being inclined along an inner peripheral surface of the projecting portion, and is fitted along an inner periphery side of the projecting portion.

8. The turbocharger according to claim 2, further comprising:

a projecting portion, which is formed on the heat-shielding plate, projects from the separation portion toward a side opposite to the turbine impeller, and has an inner peripheral surface having an inclined shape of being inclined with respect to the axial direction of the shaft; and a fitting portion, which is formed on the bearing housing, projects from a wall surface on the turbine impeller side toward the separation portion side, has an outer peripheral surface having an inclined shape of being inclined along an inner peripheral surface of the projecting portion, and is fitted along an inner periphery side of the projecting portion.

9. The turbocharger according to claim 3, further comprising:

a projecting portion, which is formed on the heat-shielding plate, projects from the separation portion toward a side opposite to the turbine impeller, and has an inner peripheral surface having an inclined shape of being inclined with respect to the axial direction of the shaft; and a fitting portion, which is formed on the bearing housing, projects from a wall surface on the turbine impeller side toward the separation portion side, has an outer peripheral surface having an inclined shape of being inclined along an inner peripheral surface of the projecting portion, and is fitted along an inner periphery side of the projecting portion.

10. The turbocharger according to claim 4, further comprising:

a projecting portion, which is formed on the heat-shielding plate, projects from the separation portion toward a side opposite to the turbine impeller, and has an inner peripheral surface having an inclined shape of being inclined with respect to the axial direction of the shaft; and a fitting portion, which is formed on the bearing housing, projects from a wall surface on the turbine impeller side toward the separation portion side, has an outer peripheral surface having an inclined shape of being inclined along an inner peripheral surface of the projecting portion, and is fitted along an inner periphery side of the projecting portion.

11. The turbocharger according to claim 5, further comprising:

a projecting portion, which is formed on the heat-shielding plate, projects from the separation portion toward a side opposite to the turbine impeller, and has an inner peripheral surface having an inclined shape of being inclined with respect to the axial direction of the shaft; and a fitting portion, which is formed on the bearing housing, projects from a wall surface on the turbine impeller side toward the separation portion side, has an outer peripheral surface having an inclined shape of being inclined along an inner peripheral surface of the projecting portion, and is fitted along an inner periphery side of the projecting portion.

12. A turbocharger, comprising:

a separation wall surface, which is a wall surface of a bearing housing on a turbine impeller side, is positioned on an inner side with respect to an outer periphery of a back surface of the turbine impeller on the bearing housing side in a radial direction of a shaft, and is separated from the back surface in an axial direction of the shaft; and a heat-shielding plate, including:
 a separation portion, which is separated from the separation wall surface in the axial direction, and is positioned between the back surface of the turbine impeller and the separation wall surface; and
 an insertion portion, which receives a fastening member inserted thereinto in a direction orthogonal to the axial direction of the shaft, the heat-shielding plate being mounted to the bearing housing by the fastening member, wherein the heat-shielding plate does not contact the separation wall surface in the zxial direction of the shaft.

* * * * *